United States Patent [19]

La Neve

[11] Patent Number: 5,634,719
[45] Date of Patent: Jun. 3, 1997

[54] FOOD HANDLING DEVICE WITH RETRACTABLE BOOM MOUNTED TEMPERATURE PROBE

[76] Inventor: Angelo L. La Neve, 107 Ryle Park Ave., West Paterson, N.J. 07424

[21] Appl. No.: 376,238

[22] Filed: Jan. 23, 1995

[51] Int. Cl.$^6$ ............................ G01K 1/14; G01K 13/00; A23L 1/00
[52] U.S. Cl. ................. 374/141; 374/155; 374/208; 99/342; 99/343; 294/3; 116/216
[58] Field of Search ................................. 374/155, 208, 374/141; 99/342, 343; 294/2, 3; 116/216

[56] References Cited

U.S. PATENT DOCUMENTS

| | | | |
|---|---|---|---|
| 3,060,585 | 10/1962 | Kirk | 374/141 |
| 3,373,611 | 3/1968 | Trott | 374/155 |
| 3,504,544 | 4/1970 | Tymkewicz | 374/155 |
| 4,580,909 | 4/1986 | McIntosh | 374/141 |
| 5,399,018 | 3/1995 | Hollander et al. | 374/208 |

Primary Examiner—Diego F. F. Gutierrez
Attorney, Agent, or Firm—Siegmar Silber, Esq.

[57] ABSTRACT

A cooking tool is disclosed which is a combination of a spatula for handling food and a boom-mounted probe having an indicator for checking temperature or doneness attained during cooking. The disclosure includes both a home and a fast-food restaurant embodiment of the tool. In both embodiments, the tool has a probe for measuring temperature mounted on a manually retractable boom, which probe is extendable over various sites of the food being checked. The boom is pivotally attached to the elongated arm of a spatula and by a scissor-like action is raised out of and lowered into the food. In the home model, the tool is provided with a temperature indicator in the form of a digital readout. In the fast-food restaurant model, the indicator provided is a GO/NO GO gauge and the probe and indicator fit in a quick-disconnect receptacle. In the latter model, a different gauge, when required for a specific application, may be substituted. Both units are designed for one-hand operation and have a manually controlled boom.

19 Claims, 4 Drawing Sheets

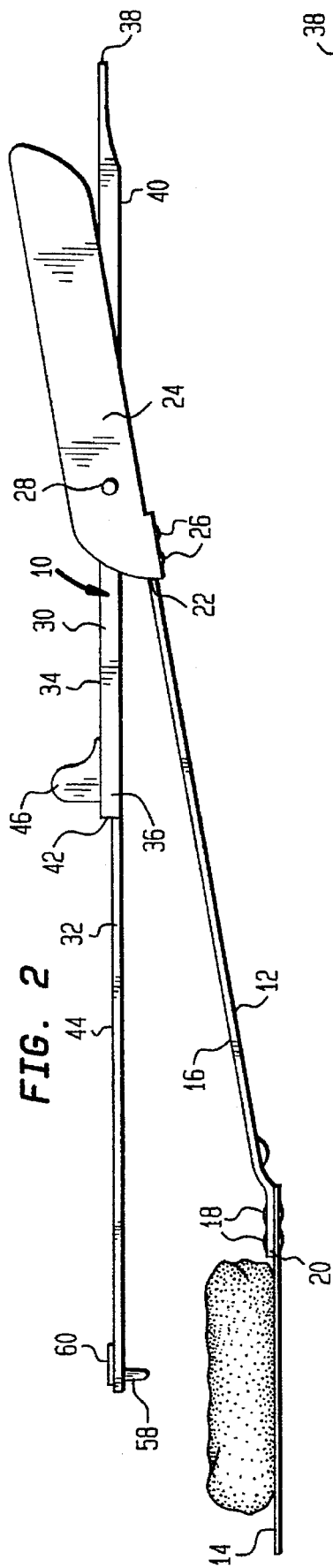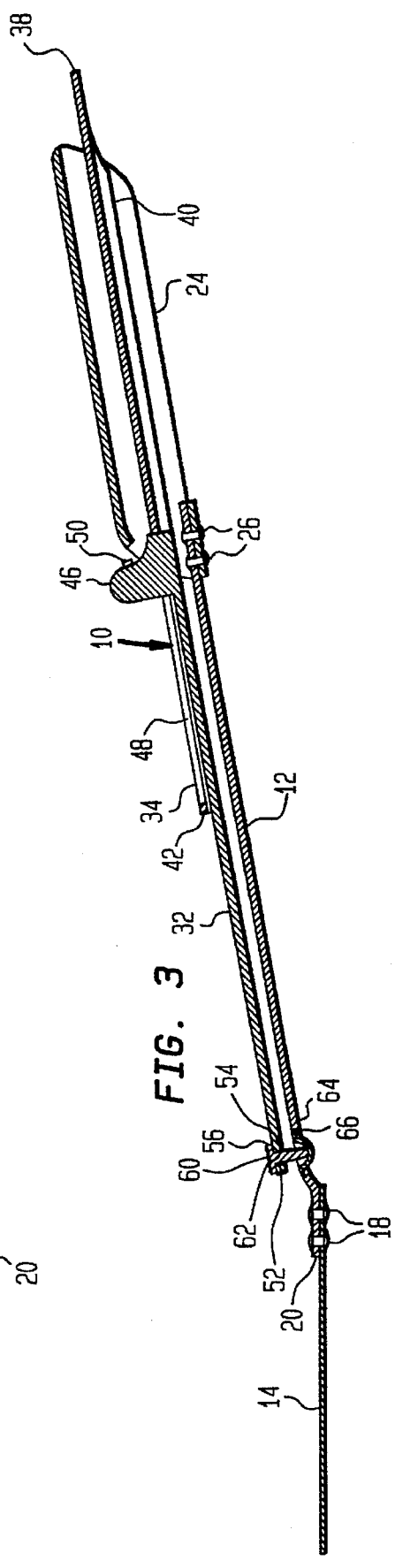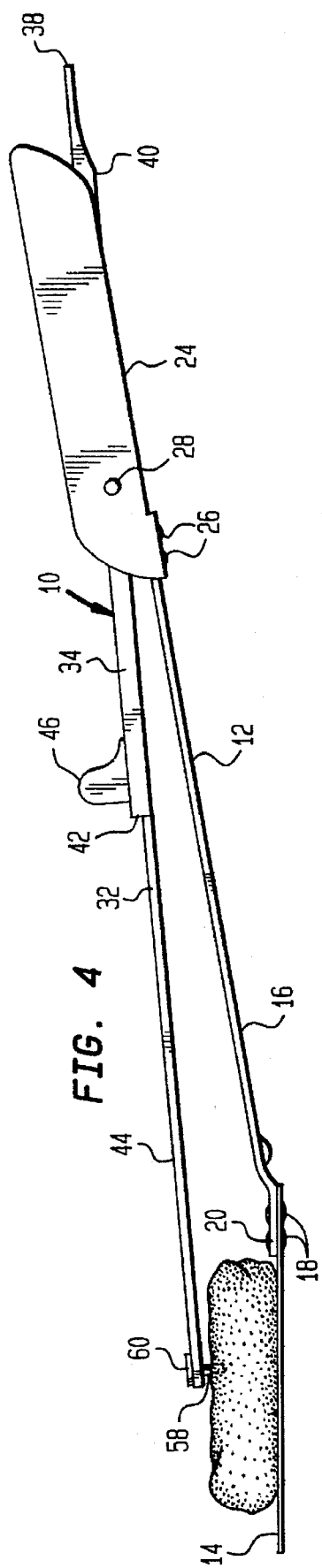

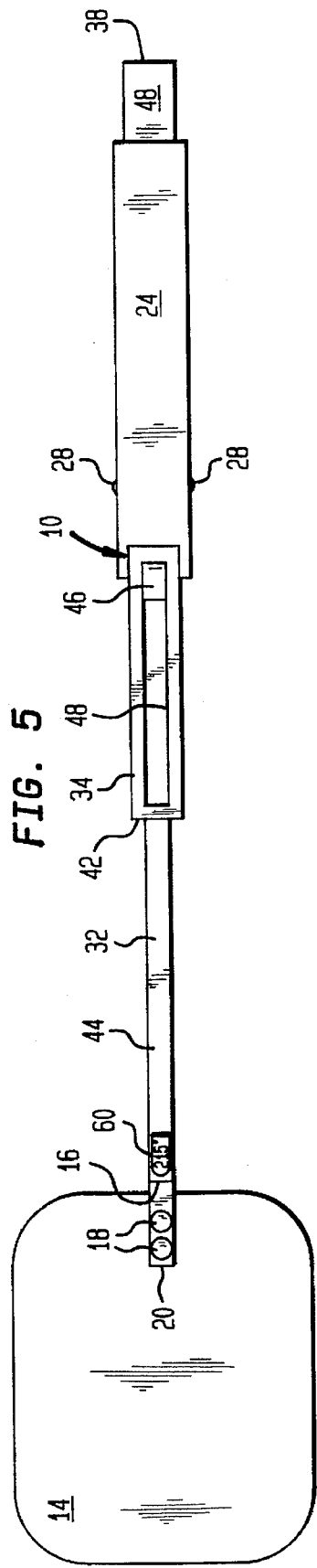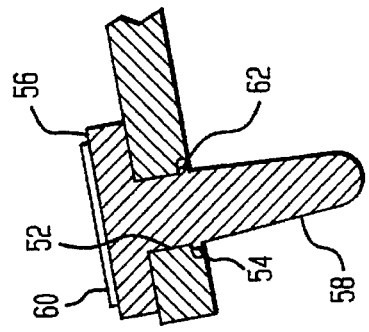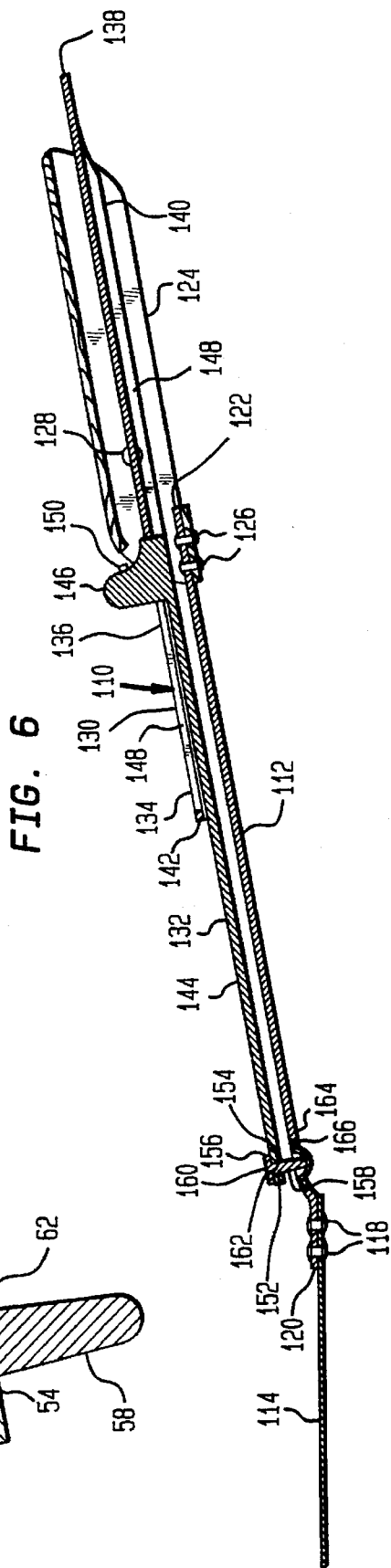

FOOD HANDLING DEVICE WITH RETRACTABLE BOOM MOUNTED TEMPERATURE PROBE

BACKGROUND OF THE INVENTION

1. Field of the Invention

This invention relates to an apparatus for use during cooking of temperature sensitive foods and provides for the handling of the food and the monitoring of the internal temperatures thereof. The invention further relates to a cooking tool manipulatable by one hand of the user, which tool has a temperature sensing probe mounted on a retractable boom so that multiple points of the object being cooked or heated can be monitored for the proper degree of doneness or of temperature elevation.

2. Background of the Prior Art

It is well known that in food preparation sufficient thermal exposure is necessary so as to exceed the thermal death time of disease causing microorganisms and, in doing so, comply with recommended health standards. The commonest disease causing bacteria are a group of anaerobic gram-negative bacteria, including the genera salmonella, shigella and Klebsiella. Of these, salmonella is most commonly found in foodstuffs, namely eggs and egg products, poultry, and meat products, particularly ground meats. With the growing popularity of ground poultry, the need for monitoring doneness and cooking temperatures has grown.

To date few satisfactory tools have been developed to monitor proper cooking techniques. Temperature probes, as will be seen herein below, have been described, but in the cooking process such probes tend not to be used when the devices are not combined with other cooking utensils.

In preparation for this application, several patents became known to the inventor hereof. These patents are as follows:

| ITEM NO. | U.S. PAT. NO. | INVENTOR | ISSUE DATE |
| --- | --- | --- | --- |
| 1 | 4,569,130 | Koller et al. | 02/11/1986 |
| 2 | 4,580,909 | McIntosh | 04/08/1986 |
| 3 | 4,832,599 | Kung | 05/23/1989 |
| 4 | 4,962,765 | Kung et al. | 10/16/1990 |
| 5 | 5,082,373 | Rohde et al. | 01/21/1992 |

In considering the various patents known to the inventor hereof the following discussion is provided:

U.S. Pat. No. 4,569,130—Koller et al.

The Koller et al. patent shows a spatula for serving cakes and pies having an integral scraper that, when not in use, is rearwardly spring biased for storage at the base of the spatula handle.

U.S. Pat. No. 4,580,909—McIntosh

The McIntosh '909 reference shows a pair of tongs with a probe mounted on the same pivot as the arms of the tongs. The action by which the temperature probe is inserted into the cooked food product is fixed in relation to the hinge element.

U.S. Pat. No. 4,832,599 to Kung and U.S. Pat. No. 4,962,765 to Kung et al.

The Kung and Kung et al. patents disclose a periodontal probe with a temperature sensing element mounted in the extreme end of a stem piece. The handle of the probe contains a temperature display unit.

U.S. Pat. No. 5,082,373—Rohde et al.

The Rohde patent discloses a food handling device for gripping and probing sides of beef or large cuts of meat as the same are moved along an overhead conveyor. The device, suitable for large automated systems, minimizes manual handling during temperature monitoring.

The inclusion herein of the above-listed patents is not intended as an admission that any such patent constitutes prior art against the claims of the present application. Applicant does not waive any right to take any action that would be appropriate to antedate or otherwise remove any listed patent as a competent reference against the claims of the present application.

SUMMARY OF THE INVENTION

In this disclosure a cooking tool is described which includes a combination of a spatula for handling food and an indicator for checking temperature or doneness attained during cooking. With the occurrence of recent food poisoning cases and the response of public health authorities, checking temperature attained or doneness has taken on especial importance. The disclosure describes both a home and a fast-food restaurant embodiment of the tool. In both embodiments, the tool has a probe for measuring temperature mounted on a manually retractable boom, which probe is extendable over various sites of the food being checked. The boom is pivotally attached to the elongated arm of a spatula and by a scissor-like action is raised out of and lowered into the food. In the home model, the tool is provided with a temperature indicator in the form of a digital readout. In the fast-food restaurant model, the indicator provided is a GO/NO GO gauge and the probe and indicator fit in a quick-disconnect receptacle. In the latter model, a different gauge, when required for a specific application, is substituted. Both units are designed for one-hand operation and have a manually controlled boom.

OBJECT AND FEATURES OF THE INVENTION

A principal object of this invention is to provide a combination food handling and temperature monitoring tool enabling a cook to ensure the compliance with prevailing health standards.

Another object of the present invention is to provide a single tool for handling and temperature indication that is simple to use and adaptable to good restaurant practices.

It is a further object of the present invention to provide a tool which facilitating multiple tests so that several internal temperature measurements are conveniently indicated without separate manipulations for each test.

It is a further object of the present invention to provide a tool that can be adapted to a processing station for a single food product with a direct reading indicator therefor, as for example, a specific indicator for the doneness of a turkey burger.

It is a further object of the present invention to provide a tool that is useful in reducing the survival in cooked foods of harmful bacteria, such as salmonella, shigella, and Klebsiella.

It is a feature of the present invention that the tool thereof can readily be used with one hand, including the lowering and raising of a probe into and out of the food item being cooked.

It is another feature of the present invention that the probe and indicator can be demounted from the tool to facilitate the separate cleaning thereof.

It is yet another feature of the present invention that the device can be used by staff with minimal training to ensure the safe preparation of foods cooked thereby.

These and other objects and features of the invention will become apparent upon reading of the following detailed description.

BRIEF DESCRIPTION OF THE DRAWINGS

In the drawing, the same parts are given the same reference numerals in the various views.

FIG. 2 is a side elevational view of the invention shown in FIG. 1;

FIG. 3 is a cross-sectional view taken vertically through the longitudinal axes of the device of FIG. 2;

FIG. 3A is a cross-sectional view showing further detail of FIG. 3, and specifically the probe mounting arrangement thereof;

FIG. 4 is a boom extended view of the boom assembly of FIG. 2 and is shown with the probe inserted in the food object being cooked;

FIG. 5 is a boom retracted view of the boom assembly of FIG. 2 and is shown with the probe docked;

FIG. 6 is a cross-sectional view taken vertically through the longitudinal axes of a second embodiment of the food handling device with a retractable boom mounted probe of this invention

DETAILED DESCRIPTION OF PREFERRED EMBODIMENTS

Figure 1:
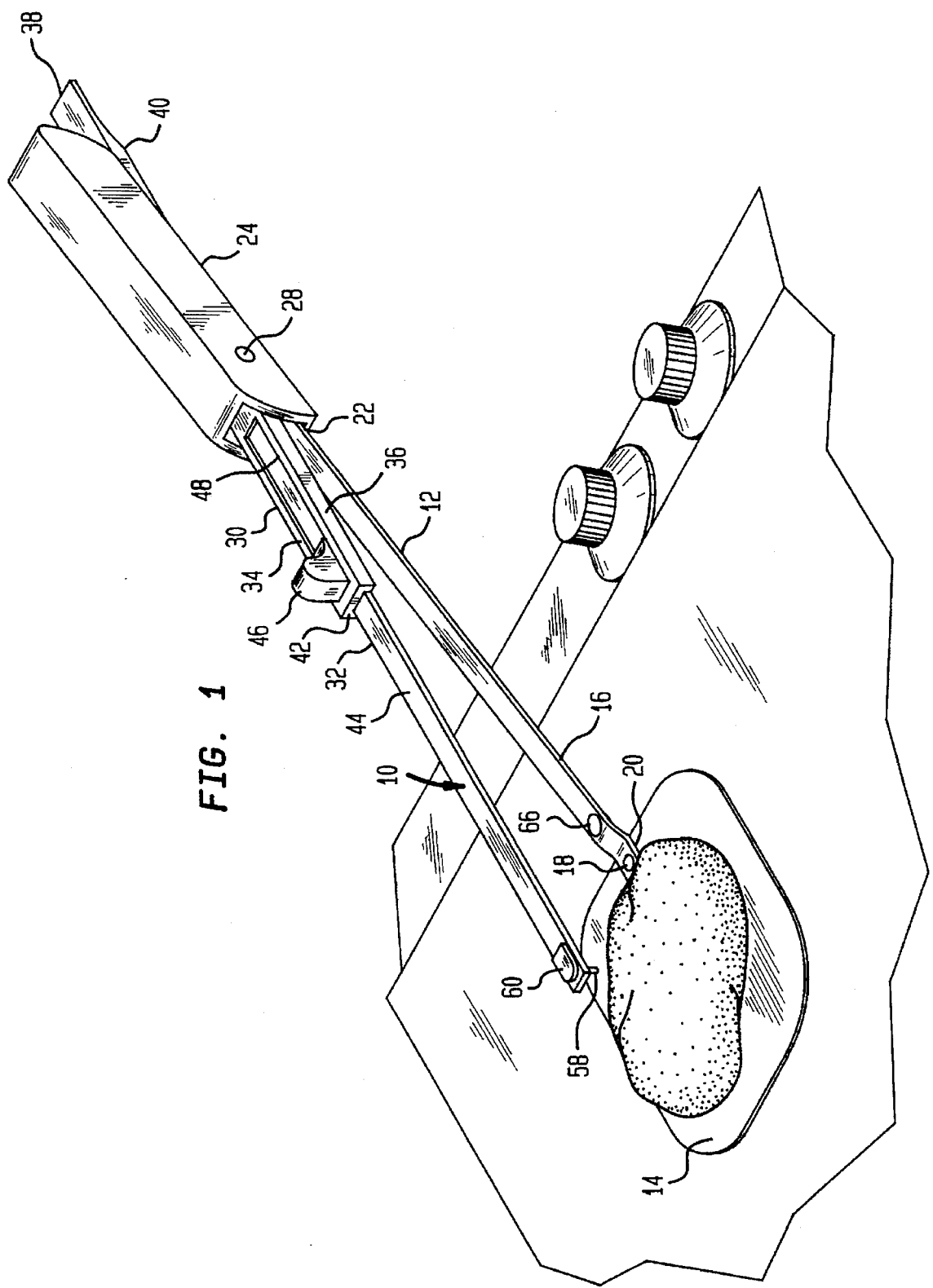
FIG. 1 is a perspective view of a food handling device with a retractable boom mounted probe of this invention and is shown with the food item being cooked.

The invention is described in detail hereinbelow in a manner which is best believed to explain the food handling and the temperature monitoring aspects. Generally, the food handling assembly acts as the base structure upon which the boom-mounted probe assembly is mounted. The base structure also provides a protective well or cavity for the storage or docking of the probe when the probe is not in use.

With reference to FIGS. 1 through 5, the food handling device with a retractable boom mounted probe is shown and is referred to generally by the reference numeral 10. The food handling assembly or base portion 12 is constructed with a spatula end 14. Although the spatula portion is typically constructed of a blade-like portion of stainless steel with or without slots therethrough, the spatula may be constructed of a food-handling approved material coated with a Teflon or other accepted plastic. Upon attachment the spatula end 14 is mounted in a balanced manner on an elongated bar or arm 16. At the point of attachment, the spatula 14 is attached by rivets 18 to the attachment end 20 of the arm 16. At the other end or handle end 22 of the arm 16, a spatula handle or grip portion 24 is affixed by rivets 26. The handle 24 is usually constructed of an insulative material such as wood or plastic so that heat is not transmitted to the user. The spatula blade 14, the arm 16, and the handle 24 are all described as separate items; however, this entire unit may optionally be of unitary construction as for example, molded from a highly temperature-resistant plastic material. Medial the food handling assembly 12, there is constructed a pivot 28 for attachment of the boom 30 of the boom-mounted probe assembly 32. The boom-mounted probe assembly 32 has a hollow, elongated body 34 with a fixed boom portion 36 having a handle end 38. A boom handle 40 is mounted thereon. At the other end, an extension end 42 is provided for housing the extendable boom portion 44 which is adapted to be in a telescopic, sliding engagement with the fixed boom portion 36. A trigger or slide control portion 46 is attached to the extendable boom portion 44 and extends through a slot 48 in the fixed boom portion 36. Optionally, the interior of the fixed boom portion 36 has a ratcheted or detented pathway (not shown) so as to maintain the extendable boom portion 44 in the position to which it is extended. The trigger portion 46 is constructed with a latch 50 which retains the extendable boom portion 44 at the initial position or at any given extended position. At the opposite end of the extendable boom portion 44, a probe socket 52 is formed and constructed with a snap indention 54. A probe and indicator assembly 56 is constructed with a temperature probe 58 at one end thereof and an indicator 60 at the other. The probe 58 extends through the probe socket 52 and a raised rib 62 engirdling the probe 58 snaps into the indention 54. The upper portion of the probe socket 52 aligns indicator 60 so that the indicator is readily observable by the operator. The indicator is a temperature scale showing that the cooked product is in the "safe" temperature zone. The scale is either a degree scale with a pointer or a digital display each of which show the interior temperature of the item being monitored.

Figure 7:
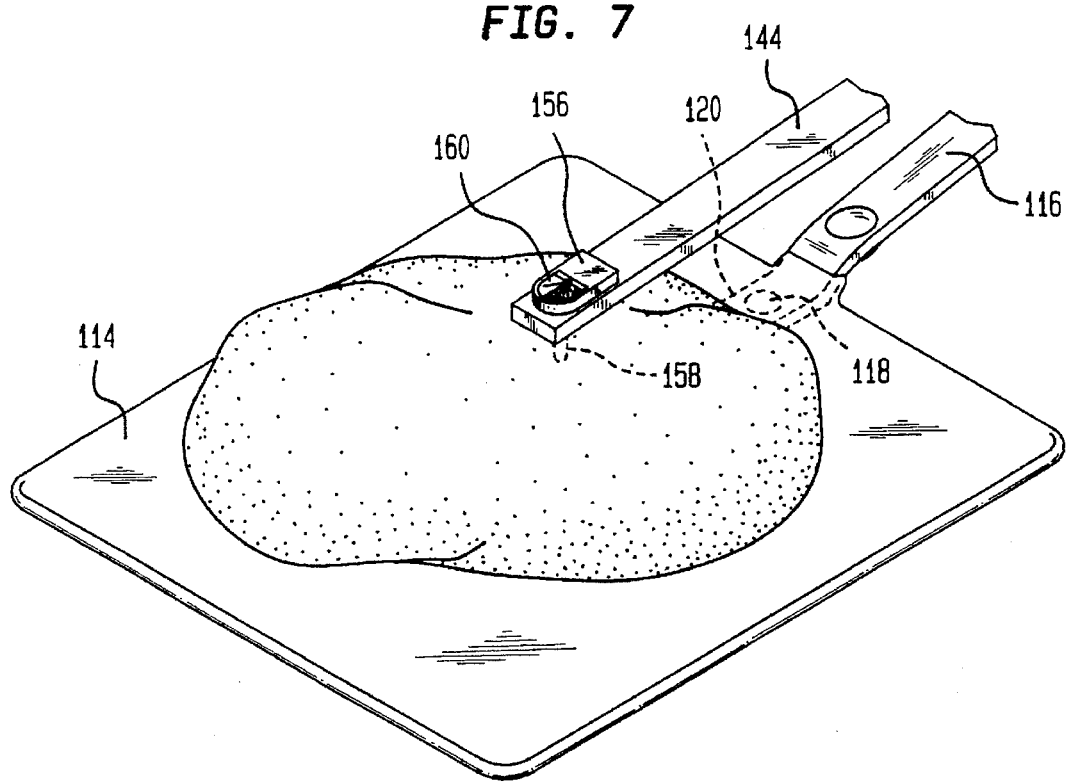
FIG. 7 is a boom extended view of the boom assembly of FIG. 6 and is provided partially cut away to show the probe inserted in the food under preparation; and, FIG. 8 is a boom retracted view of the boom assembly of FIG. 6 and is provided partially cut away to show the probe docked in the well therefor.
Figure 8:
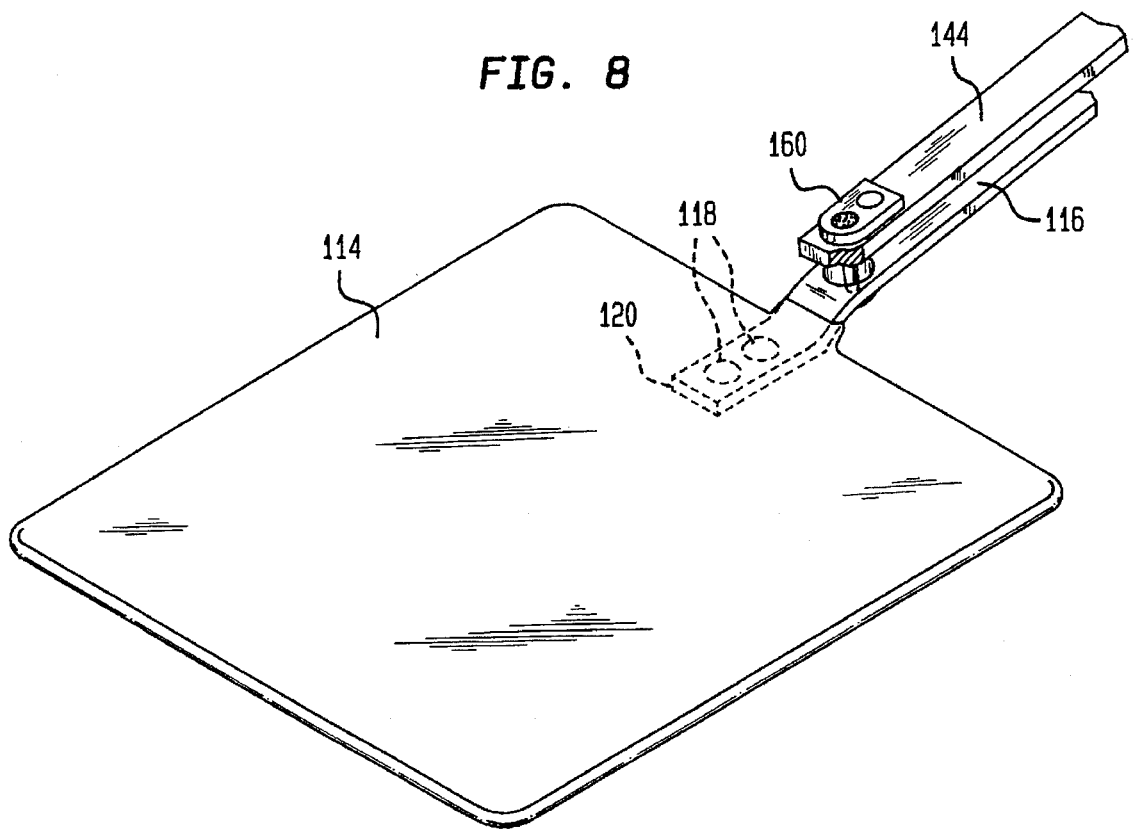

In the second embodiment, a restaurant model of the tool is detailed in FIGS. 6 through 8 hereof and is designed for the fast food marketplace. In the second embodiment similar parts of those in the first embodiment are provided with reference numerals "100" units higher. This "temperature probe 58" is seen to correspond to "temperature probe 158" in the second embodiment. With reference to FIGS. 6 through 8, the second embodiment of a food handling device with a retractable boom mounted probe is shown and is referred to generally by the reference numeral 110. The food handling assembly or base portion 112 is constructed with a spatula end 114. In this embodiment, the spatula portion is constructed with a blade-like portion of stainless steel without slots therethrough, and the spatula is constructed with a food-grade Teflon coating or other accepted plastic. Upon attachment the spaula end 114 is mounted in a balanced manner on an elongated bar or arm 116. At the point of attachment, the spatula 114 is attached by rivets 118 to the attachment end 120 of the arm 116. At the other end or handle end 122 of the arm 116, a spatula handle or grip portion 124 is affixed by rivets 126. The handle 124 is constructed of wood which being an insulative material retards the transmission of heat to the user. Medial the food handling assembly 112, there is constructed a pivot 128 for attachment of the boom 130 of the boom-mounted probe assembly 132. The boom-mounted probe assembly 132 has a hollow, elongated body 134 with a fixed boom portion 136 having the handle at end 138 thereof a boom handle 140. At the other end, an extension end 142 is provided for housing the extendable boom portion 144 which is adapted to be in sliding engagement with the fixed boom portion 136. A trigger portion 146 attached to the extendable boom portion 144 extends through a slot 148 in the fixed boom portion 136. Optionally, the interior of the fixed boom portion 136 has a ratcheted or detented pathway (not shown) so as to maintain the extendable boom portion 144 in the position to which it is extended. The trigger portion 146 is constructed with a latch 150 which retains the extendable boom portion 144 at the initial position or at any given extended position.

At the opposite end of the extendable boom portion 144, a probe socket 152 is formed that is constructed with a snap indention 154. A probe and indicator assembly 156 is constructed with a temperature probe 158 at one end thereof and an indicator 160 at the other. The probe 158 extends through the probe socket 152 and a raised rib 162 engirdling the probe 158 snaps into the indention 154. The upper portion of the probe socket 152 aligns indicator 160 so that the indicator is readily observable by the operator. The indicator is a specific doneness gauge or a GO/NO GO indicator showing that the cooked product is in the "safe" temperature zone. The probe and indicator assembly 156 is quickly disconnected and replaced by another probe and indicator assembly 156 for a different food product. The probe socket or quick disconnect receptacle 152 is for permitting removal and replacement as a unit of the probe and temperature indicator assembly 156. The quick disconnect receptacle 152 is mounted in the extension boom segment 144 in the end opposite the telescopic engagement thereof in the fixed boom portion 136. This facilitates the sanitary maintenance of the food handling tool.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A food handling tool for a user with food-under-preparation, said tool operable by one hand of the user and providing a combination handling and temperature monitoring implement, said tool comprising, in combination:

an elongated arm portion;

a boom portion medially and pivotally attached in scissor-like fashion to said elongated arm portion, said boom portion being extendable and retractable to range over various sites of said food-under-preparation, said boom portion being lowered and raised by scissor-like movement of and between said elongated arm portion and said boom portion, said boom portion comprising;

a fixed boom segment of elongated form having a hollow interior at one end thereof;

an extension boom segment of elongated form having an external configuration adapted at one end thereof for telescopic engagement within the hollow interior of said fixed boom segment; and, control means for manual operation by the user to enable the extension and retraction of said extension boom segment above one of said various sites; and, a probe mounted to said extension boom segment in an end thereof opposite said telescopic engagement for internal temperature monitoring at one of said various sites of said food-under-preparation, said probe by extension and retraction of said boom segment being positionable above one of said various sites and, when inserted therein by selectively lowering said boom portion, operative to indicate the temperature thereof.

2. A food handling tool as described in claim 1 further comprising a temperature indicator in cooperative functional relation with said probe.

3. A food handling tool as described in claim 2 wherein said temperature indicator is a doneness gauge indicating safe and unsafe levels of cooking.

4. A food handling tool as described in claim 2 wherein said temperature indicator is a gauge having a temperature scale and pointer.

5. A food handling tool as described in claim 2 wherein said temperature indicator is a digital direct-reading temperature scale.

6. A food handling tool as described in claim 2 wherein said extension boom segment further comprises:

quick disconnect receptacle means for permitting removal and replacement as a unit of said probe and said temperature indicator, said quick disconnect receptacle mounted to said extension boom segment in the end opposite said telescopic engagement thereof; whereby the sanitary maintenance of the food handling tool is enhanced.

7. A food handling tool as described in claim 1 further comprising:

a first handle portion;

said elongated arm portion extending therefrom and attached at one end thereof to said first handle portion;

a spatula blade attached to said elongated arm portion at the end opposite said first handle portion; and, a second handle portion;

said fixed boom segment extending therefrom and attached at one end thereof to said second handle portion;

said second handle portion mounted in cooperative relation to said first handle portion.

8. A food handling tool as described in claim 1 wherein said boom portion further comprises a detent means for maintaining the telescopic engagement between said fixed boom segment and said extension boom segment at predetermined extended positions.

9. A food handling tool for a user with food-under-preparation, said tool operable by one hand of the user and providing a combination handling and temperature monitoring implement, said tool comprising, in combination:

a first handle portion;

an elongated arm portion extending therefrom and attached at one end thereof to said first handle portion;

a spatula blade attached to said elongated arm portion at the end opposite said first handle portion;

a second handle portion mounted in cooperative relation to said first handle portion;

a boom portion extending therefrom and attached at an attachment end thereof to said second handle portion, said boom portion medially and pivotally attached in scissor-like fashion to said elongated arm portion, said boom portion being extendable and retractable to range over various sites of said food-under-preparation and said boom portion being lowered and raised by scissor-like movement of and between said elongated arm portion and said boom portion; and, a probe mounted to said boom portion in the end opposite said attachment end for internal temperature monitoring at one of said various sites of said food-under-preparation and, when inserted therein by selectively lowering of said boom portion, operative to indicate the temperature thereof.

10. A food handling tool as described in claim 9 wherein said boom portion further comprises:

a fixed boom segment of elongated form having a hollow interior at one end thereof;

an extension boom segment of elongated form having an external configuration adapted for telescopic engagement within the hollow interior of said fixed boom segment; and, control means for manual operation by the user to enable the extension and retraction of the extension boom segment and to position said probe above one of said various sites.

11. A food handling tool as described in claim 10 wherein said boom portion further comprises a detent means for maintaining the telescopic engagement between said fixed boom segment and said extension boom segment at predetermined extended positions.

12. A food handling tool as described in claim 9 further comprising a temperature indicator in cooperative functional relation with said probe and wherein said boom portion further comprises:

quick disconnect receptacle means for permitting removal and replacement as a unit of said probe and said temperature indicator;

thereby enhancing the sanitary maintenance of the food handling tool.

13. A food handling tool as described in claim 12 wherein said temperature indicator is a doneness gauge indicating safe and unsafe levels of cooking.

14. A food handling tool as described in claim 12 wherein said temperature indicator is a gauge having a temperature scale and pointer.

15. A food handling tool as described in claim 12 wherein said temperature indicator is a digital direct-reading temperature scale.

16. A food handling tool for a user with food-under-preparation, said tool operable by one hand of the user and providing a combination handling and temperature monitoring implement, said tool comprising, in combination:

an elongated arm portion;

a boom portion medially and pivotally attached in scissor-like fashion to said elongated arm portion, said boom portion being extendable and retractable to range, by telescopic movement, over various sites of said food-under-preparation and said boom portion being lowered and raised by scissor-like movement of and between said elongated arm portion and said boom portion, said boom portion comprising;

a fixed boom segment of elongated form having a hollow interior at one end thereof;

an extension boom segment of elongated form having an external configuration adapted at one end thereof for telescopic engagement within the hollow interior of said fixed boom segment; and, control means manually operable by the user enabling the extension and retraction of said extension boom segment to position said probe above one of said various sites; and, a probe mounted to said extension boom segment in an end opposite said telescopic engagement thereof, said probe monitoring the internal temperature at one of said various sites of said food-under-preparation;

a temperature indicator in cooperative functional relation with said probe and being operable, when, by selectively lowering said boom portion, the probe is inserted in said food-under-preparation to indicate the internal temperature; and, quick disconnect receptacle means for permitting removal and replacement as a unit of said probe and said temperature indicator, said quick disconnect receptacle mounted to said extension boom segment in the end opposite said telescopic engagement thereof.

17. A food handling tool as described in claim 16 wherein said boom portion further comprises a detent means for maintaining the telescopic engagement between said fixed boom segment and said extension boom segment at predetermined extended positions.

18. A food handling tool as described in claim 16 wherein said temperature indicator is a doneness gauge indicating safe and unsafe levels of cooking.

19. A food handling tool as described in claim 16 wherein said temperature indicator is a digital direct-reading temperature scale.

* * * * *